Feb. 8, 1944.  E. F. SHIPMAN  2,341,391
COMBINATION WELDING PROTECTIVE DEVICE AND PERISCOPE
Filed Dec. 26, 1940
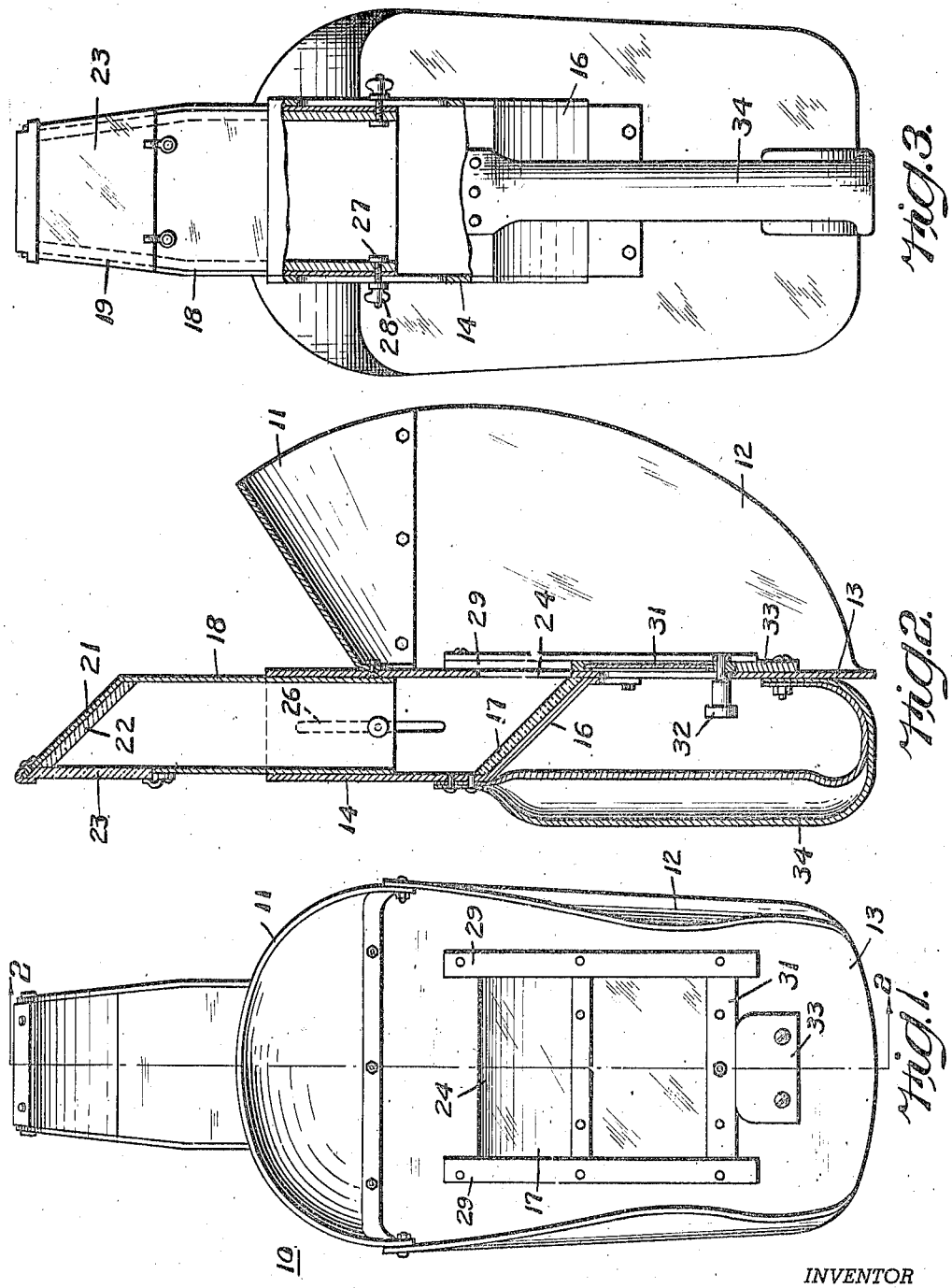
INVENTOR
EMANUEL F. SHIPMAN
BY W. G. Sullivan
ATTORNEY Patented Feb. 8, 1944

2,341,391

UNITED STATES PATENT OFFICE 2,341,391

COMBINATION WELDING PROTECTIVE DEVICE AND PERISCOPE

Emanuel F. Shipman, Philadelphia, Pa.

Application December 26, 1940, Serial No. 371,632

2 Claims. (Cl. 2—8)

This invention relates to welding devices, and more particularly to a combined welding mask and periscope.

In many instances, it is desired to effect a welding operation in a limited space which is not visually accessible to an operator employing a conventional welding mask. The operator is further hampered in attempting to visually follow the progress of his operations under these conditions since relatively thick heat resisting gloves are usually worn.

It is a primary object of the invention to provide an improved protective mask for welding operations, whereby an operator may more efficiently work in a limited space.

Another object of the invention is to provide a welding mask having a periscope associated therewith, whereby an operator may efficiently weld at a point beyond his normal line of vision.

A still further object of the invention is to provide a welding mask having extensible periscope means adapted to be projected into a space otherwise visually inaccessible.

A still further object of the invention is to provide a combined welding mask and periscope having means associated therewith for eliminating infra-red and ultra-violet rays.

According to the invention, a welding mask, provided with the conventional face shielding portions and a vision slot, has a periscope extending from the vision slot. An inclined mirror surface is disposed in alignment with the vision slot, and a complementary mirror surface is disposed at the extended end of the periscope whereby an object disposed beyond the normal range of vision can be easily seen. The periscope is relatively small in cross-section, and can be extended into a limited space to give the operator a clear view of an object to be welded disposed in such space and where it would otherwise be impossible for the operator to visually follow the welding operation. A slide adapted to filter ultra-violet and infra-red rays is provided for protecting the eyes of the operator and the slide is preferably movable to a non-filtering position, whereby a clearer view of an object may be afforded when the welding operation is not in progress.

The invention will be more readily understood by reference to the following description and drawing wherein:

Figure 1 is a rear elevational view of my improved device,

Figure 2 is a section on the line 2—2 of Figure 1, and

Figure 3 is a front elevational view of the device of Figures 1 and 2.

Referring now to the drawing, I have indicated generally at 10 a face shield formed of suitable heat resisting material, such as fibre board, and which may be of conventional form. The shield comprises an arcuate head protecting portion 11, side portions 12 preferably resiliently flared inwardly to protect the sides of the face, and a front portion 13 to protect the face and neck of a user. Secured to the front face of portion 13 is a sleeve member 14 generally rectangular in cross-section, and having an inclined lower end 16. Supported on the upper face of inclined end 16 is a mirror element 17. A cooperating sleeve member 18 is telescoped within member 14 and preferably has tapered upper side walls, as indicated at 19. The upper end 21 of member 18 is also inclined, and on its inner surface supports a second mirror element 22.

Disposed forwardly of mirror element 22 is a transparent pane 23, whereby light rays will be passed therethrough, and reflected from the surface of element 22 to element 17. Elements 22 and 17 are substantially parallel and are each disposed preferably at an angle of 45°, whereby light rays will be reflected rearwardly from element 17 through a generally rectangular vision slot 24 provided in shield portion 13. It will now be understood that an object disposed forwardly of the device and in alignment with the pane 23 of the extended end of the periscope will be visible to an operator looking through vision slot 24. It is understood that slot 24 may be covered with transparent material if desired.

I have illustrated sleeve members 14 and 18 as being relatively movable longitudinally and the members can be locked in an adjusted position in any desired manner as by providing elongated slots 26 in member 14 and projecting headed screws 27 through perforations in sleeve member 18 and slots 26 to engage thumb nuts 28. Since the light rays striking the mirror element 22 are projected generally parallel to the walls of sleeve members 14 and 18, the sleeve member 18 may be substantially extended without impairing the visual efficiency of the device. Although I have shown the periscope as comprising two telescoping sleeve members, it is understood that a single sleeve member of a desired fixed length may be used.

At each side of vision slot 24 I provide guide strips 29 for receiving a slide 31 operable by a knob 32. Knob 32 projects through an elongated slot provided in front portion 13 and a stop 33 limits movement of slide 31. Slide 31 is formed of a material which will filter out ultra-violet and infra-red rays, but which under welding heat permits an object to be welded to be clearly visible. Material which will filter the aforementioned rays is well known, and any suitable material may be used. This material is usually of a color which restricts clear vision of an object in normal light, and by providing a movable slide 31, the object to be welded may be viewed in normal light by moving the slide to the position illustrated in Figure 2 when the welding operation is not being performed.

I further contemplate that the slide 31 may be disposed at the extended end of the periscope whereby the aforementioned ultra-violet and infra-red rays will be filtered prior to striking the surface of mirror element 22. In this instance, the slide 31 may be positioned either externally or internally of sleeve member 18 and may be positioned in alignment with pane 23. Also, the filtering material 31 may be positioned in the tubular portion of the periscope between the mirror elements 17 and 22. For example, it could be pivoted to the left hand wall of sleeve member 18, as viewed in Figure 2, so that it would normally be extended in a horizontal position to filter the ultra-violet and infra-red rays, and when desired it could be caused to lie flat against said wall in a vertical position. Any suitable arrangement for controlling the position of the filtering material may be employed, such as a crank arm, disposed externally of member 18 at the pivotal axis and secured to an operating member. In each instance, I prefer that the operating member for the slide extend to the lower portion of the device and be provided with a knob or the like at its lower end for convenience of operating the slide.

A suitable hand grip 34 may be provided for holding the device and/or the device may be in the form of a helmet adapted to be secured to the head of an operator in an ordinary manner since it is relatively light in weight. Sleeve members 14 and 18 are formed of light weight material having suitable heat resisting qualities, such as fibre board.

Although for purposes of illustration I have shown mirror elements 17 and 22, and pane 23 as being formed of glass it is understood that any suitable material may be used.

Although I have shown and described a preferred form of my invention, I contemplate that numerous and extensive departures may be made therefrom without departing from the spirit of my invention and the scope of the appended claims.

The invention is hereby claimed as follows:

1. The combination of a welding mask comprising a main body portion having a vision opening in the front wall thereof, a periscope having an end portion extending above the mask secured to said front wall with its lower end covering the vision opening, the periscope comprising a telescopic tubular member having a transparent portion at the extended end thereof, remote from the vision opening, whereby light rays may be admitted to the periscope, and a pair of fixed substantially parallel mirror elements disposed at opposite ends of the periscope whereby light rays passing through said transparent portion in a given direction may be reflected in a parallel direction through said opening.

2. The combination of a welding mask comprising a relatively flat front wall having a vision opening therein, a telescopic periscope secured to said front wall having one end portion extending above the mask, a fixed mirror element in alignment with said opening and inclined relative to the mask front wall, a second fixed mirror element at the extended end of the periscope substantially parallel to the first mirror element, means for admitting light rays to the second mirror element and reflecting said rays to the first mirror element and then through said opening, and means for filtering said rays prior to the rays striking the eyes of an operator, comprising a slide selectively movable to a position covering said vision opening.

EMANUEL F. SHIPMAN.